US011119507B2

(12) United States Patent
Parra Vilchis et al.

(10) Patent No.: US 11,119,507 B2
(45) Date of Patent: Sep. 14, 2021

(54) HARDWARE ACCELERATOR FOR ONLINE ESTIMATION

(71) Applicant: Intel Corporation, Santa Clara, CA (US)

(72) Inventors: Jose Ignacio Parra Vilchis, Guadalajara (MX); Rodrigo Aldana Lopez, Zapopan (MX); David Gomez Gutierrez, Tlaquepaque (MX); Rafael de la Guardia Gonzalez, Guadalajara (MX); Leobardo Campos Macias, Guadalajara (MX)

(73) Assignee: INTEL CORPORATION, Santa Clara, CA (US)

( * ) Notice: Subject to any disclaimer, the term of this patent is extended or adjusted under 35 U.S.C. 154(b) by 560 days.

(21) Appl. No.: 16/020,224

(22) Filed: Jun. 27, 2018

(65) Prior Publication Data

US 2019/0050370 A1 Feb. 14, 2019

(51) Int. Cl.
*G06F 7/64* (2006.01)
*G05D 1/10* (2006.01)
(Continued)

(52) U.S. Cl.
CPC ........... *G05D 1/101* (2013.01); *B64C 39/024* (2013.01); *G05B 19/042* (2013.01); *G06F 7/556* (2013.01); *G06F 7/64* (2013.01); *G06F 17/13* (2013.01); *G06N 3/0445* (2013.01); *G06N 3/0454* (2013.01); *G06N 3/063* (2013.01); *G06N 3/084* (2013.01); *G06N 3/088* (2013.01); *B64C 2201/108* (2013.01); *B64C 2201/14* (2013.01)

(58) Field of Classification Search
CPC ..... B64C 2201/14; G06F 17/13; G06F 7/556; G06F 7/64
See application file for complete search history.

(56) References Cited

U.S. PATENT DOCUMENTS

| | | | | | |
|---|---|---|---|---|---|
| 4,947,334 | A | * | 8/1990 | Massey | G05D 1/0669 701/3 |
| 7,769,703 | B2 | * | 8/2010 | Calise | G05B 13/027 706/23 |

(Continued)

FOREIGN PATENT DOCUMENTS

WO WO-2019067110 A1 * 4/2019 ........... B64C 39/024

OTHER PUBLICATIONS

X. Wang and H. Lin, "Design and frequency analysis of continuous finte time convergent differentiator", pp. 1-12, (Year: 2011).*

(Continued)

*Primary Examiner* — Kibrom K Gebresilassie
(74) *Attorney, Agent, or Firm* — Spectrum IP Law Group LLC

(57) ABSTRACT

An apparatus of an autonomous device comprises one or more state estimators to estimate one or more states of the autonomous device, wherein the one or more state estimators are to generate one or more derivatives of translational measurements, orientation measurements, reference translational values, and reference orientation values, and one or more controllers to receive an output from the one or more state estimators to provide control signals to control the autonomous device. The one or more state estimators include a hardware differentiator to generate the one or more derivatives.

20 Claims, 12 Drawing Sheets

(51) Int. Cl.
*G06F 17/13* (2006.01)
*B64C 39/02* (2006.01)
*G05B 19/042* (2006.01)
*G06F 7/556* (2006.01)
*G06N 3/04* (2006.01)
*G06N 3/063* (2006.01)
*G06N 3/08* (2006.01)

(56) References Cited

U.S. PATENT DOCUMENTS

| | | | | |
|---|---|---|---|---|
| 10,061,312 | B1* | 8/2018 | Anderson | G05D 1/0238 |
| 10,372,134 | B2 | 8/2019 | Lopez et al. | |
| 10,564,650 | B2 | 2/2020 | Gutierrez et al. | |
| 10,647,424 | B2 | 5/2020 | Gutiérrez et al. | |
| 10,712,425 | B1* | 7/2020 | Rao | G01S 13/88 |
| 2004/0133308 | A1* | 7/2004 | Kato | G06N 3/008 |
| | | | | 700/245 |
| 2005/0055131 | A1* | 3/2005 | Mikami | B62D 57/032 |
| | | | | 700/245 |
| 2009/0299496 | A1* | 12/2009 | Cade | G05B 17/02 |
| | | | | 700/29 |
| 2010/0030716 | A1* | 2/2010 | Calise | G05B 13/027 |
| | | | | 706/23 |
| 2010/0280699 | A1* | 11/2010 | Bageshwar | G05D 1/0231 |
| | | | | 701/26 |
| 2012/0209455 | A1* | 8/2012 | Warkomski | G05D 1/0808 |
| | | | | 701/3 |
| 2014/0251123 | A1* | 9/2014 | Venema | F41H 11/02 |
| | | | | 89/41.22 |
| 2017/0212529 | A1* | 7/2017 | Kumar | G01C 21/20 |
| 2017/0301111 | A1* | 10/2017 | Zhao | G01C 25/005 |
| 2018/0164124 | A1* | 6/2018 | Viswanathan | G01C 21/165 |
| 2018/0345504 | A1* | 12/2018 | Chen | G05D 1/024 |
| 2019/0004519 | A1 | 1/2019 | Lopez et al. | |
| 2019/0033892 | A1 | 1/2019 | Gutierrez et al. | |
| 2019/0092464 | A1 | 3/2019 | Gutiérrez et al. | |
| 2019/0202568 | A1* | 7/2019 | Borup | B64D 15/12 |
| 2019/0260768 | A1* | 8/2019 | Mestha | G06F 21/50 |
| 2020/0126239 | A1* | 4/2020 | Qian | B64D 47/08 |

OTHER PUBLICATIONS

"Absolute Value" (Herein referred as "Absolute Value"), pp. 1-2, (Year: 2007).*

* cited by examiner

HARDWARE ACCELERATOR FOR ONLINE ESTIMATION

FIELD

The present disclosure generally relates to the field of electronics. More particularly, an embodiment relates to multiagent systems.

BACKGROUND

Advanced control of robotic systems, such as unmanned aerial vehicles or terrestrial vehicles, involve accurate knowledge of the states of the system. The complete set of states is not always measurable, due lack of sensors or cost of the appropriate sensors. As a result, estimates of the states may be made instead of obtaining direct measurements. Observers have the property of estimating the complete set of states of a system based in the measurable subset of states which imposes several constraints such as hard real-time processing. Due to these constraints, robotic systems are normally designed using a separate processor for estimation and control, and another processor for general-purpose algorithms.

Current processors or microcontrollers are normally used for control, estimation and/or general-purpose algorithms. These processors, however, are not suitable for applications that involve low latency or handling of interrupts with real-time constraints.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
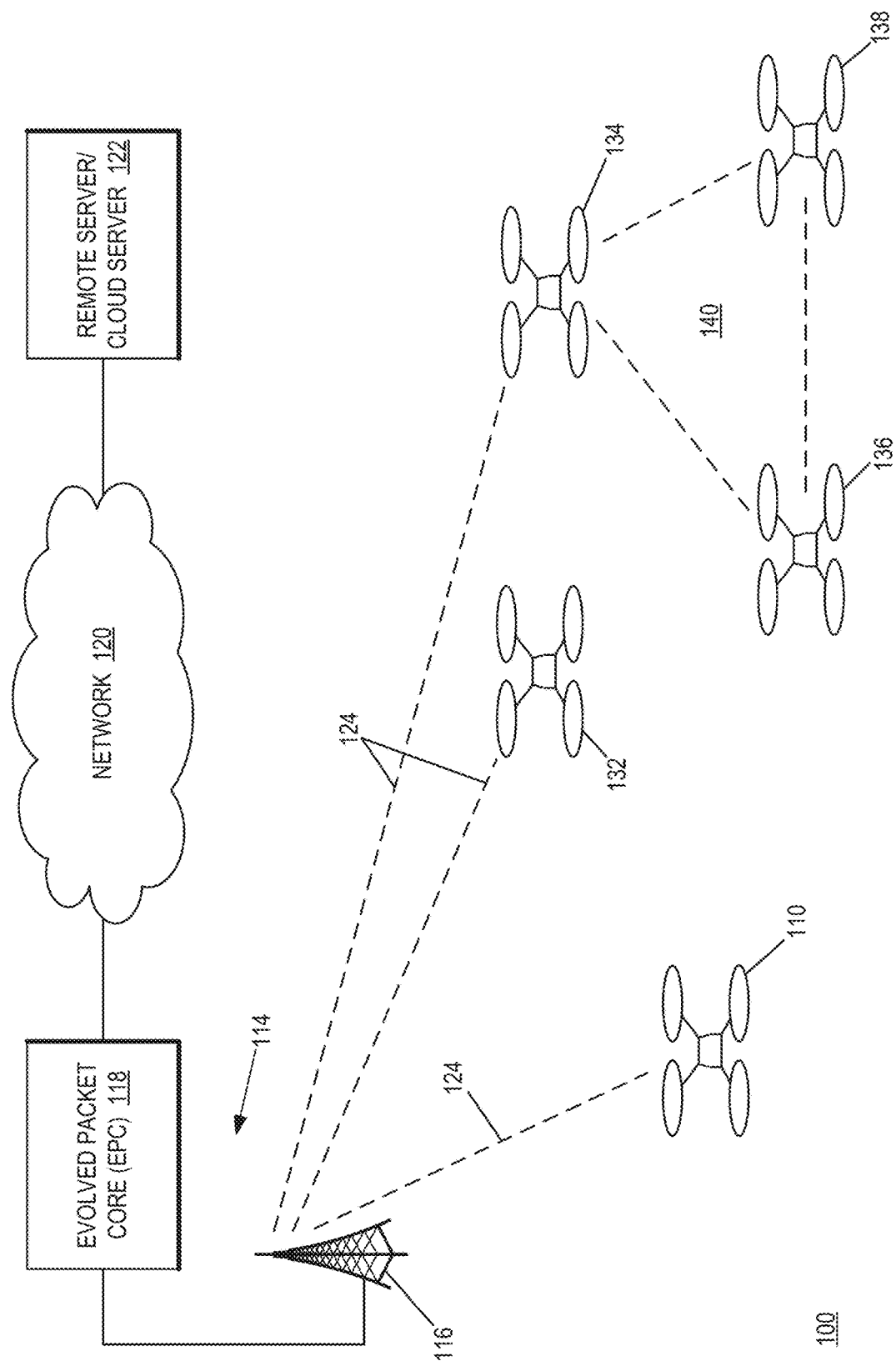
FIG. 1 is a diagram of a system of one or more robotic devices comprising one or more unmanned aerial vehicles as an example in accordance with one or more embodiments.

Referring now to FIG. 1, a diagram of a system of one or more robotic devices comprising one or more unmanned aerial vehicles as an example in accordance with one or more embodiments will be discussed. Although FIG. 1, shows a system 100 wherein the one or more robotic devices comprise one or more unmanned aerial vehicles or drones, system 100 may comprise one or more various other robotic devices including aerial vehicles or terrestrial vehicles, and the scope of the claimed subject matter is not limited in this respect. The system 100 of FIG. 1 may include one or more drones, for example drone 110, drone 132, drone 134, drone 136, and/or drone 138. A drone may comprise an unmanned aerial vehicle that may be operated by a human operation, for example via remote control or via a computer program or machine instructions executed by a processor of the drone as programmed by an operator, or may include an autonomous system to allow the drone to operate independently and dynamically responsive to one or more other drones and/or obstacles in the surrounding environment, although the scope of the claimed subject matter is not limited in these respects.

In the embodiment shown in FIG. 1, one or more of the drones may comprise a quadcopter. In one or more embodiments, one or more of the drones may be in communication with one another via one or more radio links 124 to communicate with an evolved Node B (eNB) 116 of a cellular network 114 wherein eNB 116 may couple to an evolved packet core (EPC) 118. The EPC 118 in turn may couple to a network 120 such as the Internet to couple to one or more remote servers or cloud servers 122. Alternatively or in addition to the radio links 124, one or more of the drones of system 100 may be in communication with one or more other drones via a mesh network 140 or similar type of network, for example for example using any suitable radio technology such as wireless communication in compliance with an Institute of Electrical and Electronics Engineers (IEEE) 802.11x standard or the like, or using a proximity-based services (ProSe) sidelink in accordance with a Third Generation Partnership Project (3GPP) standards using a PC5 interface between one or more other drones, vehicles, cars, or other agents, although the scope of the claimed subject matter is not limited in these respects.

One or more of the drones may include one or more processing units, one or more decision system, and or one or more control systems, to implement control processes and/or decision-making processes for the control of the one or more drones. Furthermore, although system 100 including one or more drones are discussed herein, various other systems likewise may include one or more processing units, one or more decision system, and or one or more control systems, for example other vehicle systems such as airplanes, boats, helicopters, missiles, or space vehicles, and so on, and the scope if the claimed subject matter is not limited in these respects. In accordance with one or more embodiments, some robotic systems 100 may utilize a hardware circuit to implement one or more functions including a hardware differentiator as shown in and described with respect to FIG. 4, below. Such robotic systems 100 may include multi-rotor unmanned aerial vehicles (UAVs), rovers, robots having a humanoid or other form factor. The hardware circuit also may be utilized in applications such as disturbances estimation or control parameters estimation; for example, a hardware accelerator for trajectory tracking flight control in quadcopters, a methodology for parameter agnostic robust trajectory tracking control for multirotor UAVs, a hybrid aerial ground drone with enhanced capabilities for navigation and coordination, and so on, and the scope of the claimed subject matter is not limited in these respects. A controller to control one or more of the drones of robotic system 100 is shown in and described with respect to FIG. 2, below.

Figure 2:
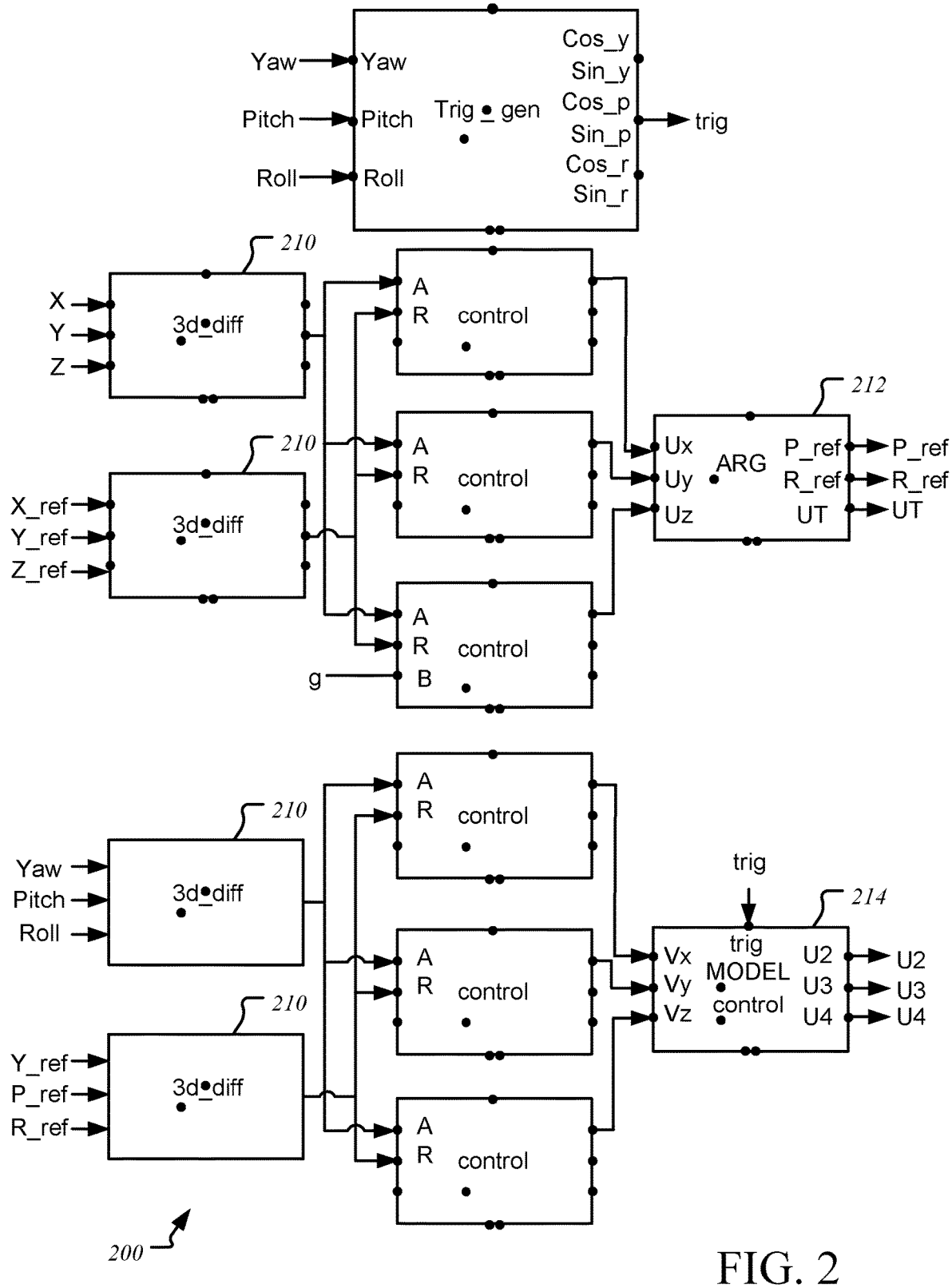
FIG. 2 is a diagram of a controller for a quadcopter in accordance with one or more embodiments.

Referring now to FIG. 2, a diagram of a controller for a quadcopter in accordance with one or more embodiments will be discussed. One or more of the drones of FIG. 1 may comprise a quadcopter controlled by controller 200 as shown in FIG. 2. The term three-dimension differentiator (3d_diff) in the 3d_diff modules 210 may refer to a group of three state estimators wherein an accelerator may be used to estimate the states of the drones or other robotic systems based on a robust differentiator realized in hardware. These 3d_diff modules 210 are used to generate the derivatives of the translational and orientation measurements together with the references needed by the controllers of the drone. Then a control module may be utilized for each variable (x, y, z, roll, pitch, yaw). The module ARG 212 is the one that takes the controller signals u_x, u_y, u_z and calculates the pitch and roll references and u_1. The module MODEL Control 214 takes the orientation control inputs and trigonometric evaluations of the orientation to get the control inputs u_2, u_3, and u_4. The algorithm of this hardware may be as follows. Differentiate the position measurements and the position reference while calculating cosine and sine of yaw. Calculate the control laws u_x, u_y, u_z while calculating cosine and sine of pitch. Calculate the pitch reference and u_1 while calculating cosine and sine of roll. Calculate the roll reference. Differentiate the orientation measurements and its references. Calculate the control laws for the orientation. Calculate u_2, u_3, u_4 using the orientation control laws and the trigonometric evaluations of the Euler angles.

It may be assumed that a robotic system 100 may be represented as a set of differential equations wherein measurements may be obtained for some of the states of the system. For example, the translational motion model of a drone comprising a quadcopter may be represented by the following equations.

$$\dot{x} = v_x$$
$$\dot{y} = v_y$$
$$\dot{z} = v_z$$

-continued $$\dot{v}_x = -\frac{1}{m}(c(\phi)c(\psi)s(\theta) + s(\phi)s(\psi))c_T u_1 + \frac{\Lambda_x}{m}$$
$$\dot{v}_y = -\frac{1}{m}(c(\phi)s(\psi)s(\psi) - c(\psi)s(\phi))c_T u_1 + \frac{\Lambda_y}{m}$$
$$\dot{v}_z = g - \frac{1}{m}(c(\phi)c(\theta))c_T u_1 + \frac{\Lambda_z}{m}$$

Assuming only measurements of position may be obtained, it may be necessary to estimate x', y', z', x", y", z". A Levant differentiator may be utilized for such estimates since a Levant differentiator has the capability of estimating these states with high accuracy by knowing only the known measurements below.

$$z_0[n+1] = z_0[n] + \tau\left(z_1[n] + k_0|\sigma[n]|^{\frac{N}{N+1}}\text{sign}(\sigma[n])\right)$$
...
$$z_i[n+1] = z_i[n] + \tau\left(z_{i+1}[n] + k_i|\sigma[n]|^{\frac{N-i}{N+1}}\text{sign}(\sigma[n])\right)$$
...
$$z_N[n+1] = z_N[n] + \tau(k_N\text{sign}(\sigma[n]))$$

In the above equations, σ[n]=f[n]−z_0[n] is the error between the measurement and the value z_0[n]. N is the differentiation order and τ is the time discretization. After some time determined by the parameters of the differentiator $z_i[n]$ will approximate $$\frac{d^i f}{dt^i}.$$

In one or more embodiments, a hardware differentiator module may be based on recurrent mathematical operations which enables the module to differentiate a system the necessary number of times with the only constraint of cycles and memory, trading off a small computation delay for higher order derivatives for a significant reduction in hardware complexity.

In order to implement the Levant differentiator as a hardware differentiator, a general power module to synthesize an exponential function and a logarithm may be provided. Such a general power module is based on the following identity.

$$|x|^z = 2^{z \cdot \log 2(|x|)}$$

Algorithms that calculate the logarithm of a number constrained to values between 1 and 2 may be used in floating point architectures. The execution time of algorithms depends heavily on the number of fractional bits used and if the value is scaled appropriately then it can be used to calculate the logarithm of any number. The algorithm for this may be as follows.

$$\log_2(x) = \log_2(\hat{x} \cdot 2^M) = \log_2(\hat{x}) + M$$

The value of M may be chosen such that $1 < \hat{x} < 2$ and it may be calculated by knowing the most significant bit of x in a high state.

After the logarithm is calculated, the next step is to solve the exponential function. Since the variable representation is fixed point, some bits for integers and other bits for fractional part, then special care should be taken. In one or more embodiments the exponential function may be solved as follows.

$$2^x = 2^{x-v} 2^v$$

In the above expression, v is the integer part of x. Therefore, x−v<1 is the fractional part. Although $2^v$ may be implemented by a barrel shifter, an algorithm that implements the exponential function for numbers between 0 and 1 may be provided as discussed herein. This latter algorithm may be based on the $4^{th}$ polynomial approximation of $2^u$ as shown below.

$$2^u \approx 1 + \ln(2)u + \frac{\ln(2)^2}{2}u^2 + \frac{\ln(2)^3}{6}u^3 + \frac{\ln(2)^4}{24}u^4$$

Figure 3A:
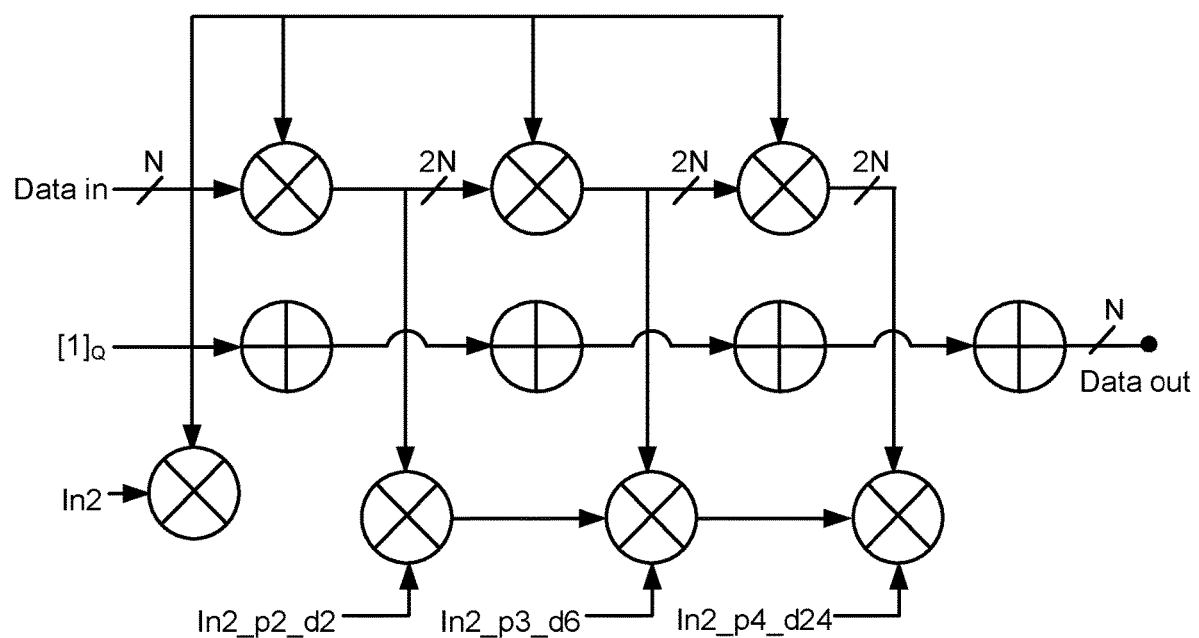
FIG. 3A and FIG. 3B are diagrams of hardware schematics in accordance with one or more embodiments.
Figure 3B:
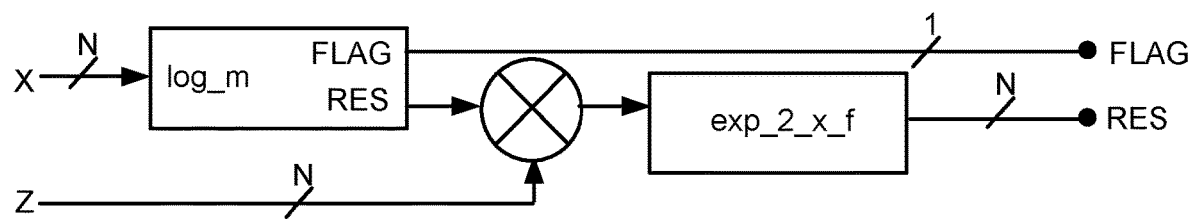

FIG. 3A illustrates the hardware 310 for an algorithm to implement the exponential function for number between 0 and 1 in accordance with one or more embodiments. In hardware 310 the multipliers are fixed point multiplier modules. These were implemented assuming that the numbers are represented as $[x]_Q = x \cdot 2^B$; where x is the real number that wants to be represented, $[x]_Q$ is the actual binary representation and B is the amount of fractional bits of the representation. Then $[x \cdot y]_Q = [x]_Q \cdot [y]_Q \cdot 2^{-B}$, which is a simple multiplier and a shifter by B. This algorithm enables a fully combinational circuit to implement the general exponential function. FIG. 3B illustrates resulting power module hardware 312 using this approach. In power module hardware 312, x and z are fixed point numbers. This module will take only B clock cycles to obtain the result $[x^z]_Q$ although the scope of the claimed subject matter is not limited in this respect. Using the approach above, a hardware differential may be realized as shown in and described with respect to FIG. 4, below.

Figure 4:
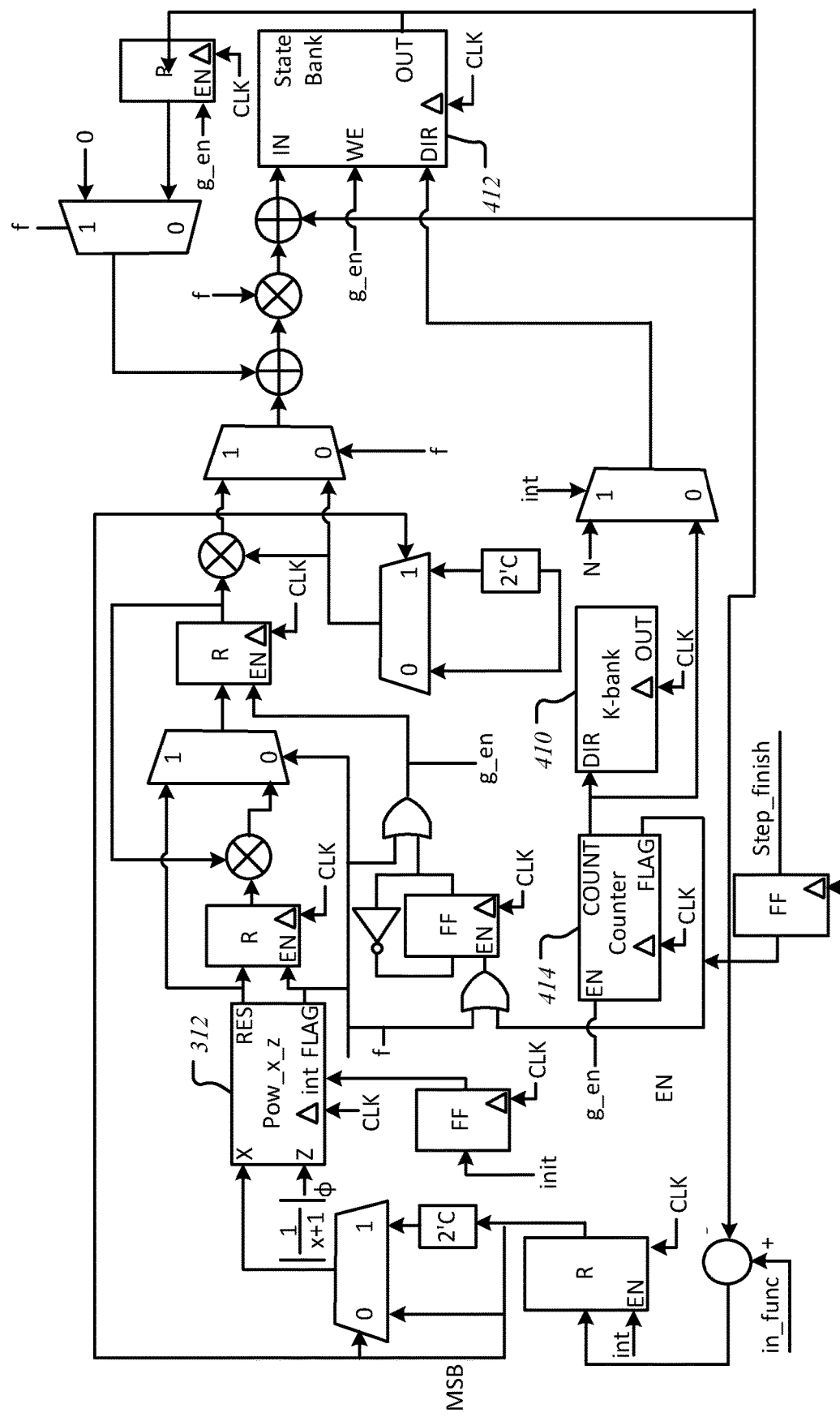
FIG. 4 is a diagram of a hardware differentiator in accordance with one or more embodiments.

Referring now to FIG. 4, a diagram of a hardware differentiator in accordance with one or more embodiments will be discussed. The hardware differentiator 400 of FIG. 4 may be utilized to realize one or more of the 3D-diff modules 210 of FIG. 2. Using the approach as illustrated in FIG. 3A and FIG. 3B above, the hardware differentiator 400 of FIG. 4 may implement the following algorithm.

1. Calculate the $N^{th}$ derivative $z_N[n+1] = z_N[n] + r(k_N \operatorname{sign}(\sigma[n]))$
2. Calculate $$|\sigma|^{\frac{1}{N+1}};$$

where σ is the measurement error and save the value in register A

3. Multiply register A by $k_i$ constant and change sign to sign(σ)
4. Sum the result to the actual estimation of the next derivative $z_{i+1}[n]$ and multiply it by the time discretization τ.
5. Sum the present estimation of the $i^{th}$ derivative $z_i[n]$.
6. Multiply register A by the original result $$|\sigma|^{\frac{1}{N+1}},$$

and save it again in A.

7. Repeat from operation 3, up to defined number of derivatives.

In such a hardware differentiator 400 that implements the above algorithm, k-bank 410 is the memory place where the configurable design gains $k_i$ are stored, and state-bank 412 is the place where the resulting estimated derivatives are stored. At the beginning when an Init signal appears, the error $\sigma[n] = f[n] - z_0[n]$ is stored in register, in the next clock cycle, the number $$|\sigma|^{\frac{1}{N+1}}$$

is requested to the power module 312. After B clock cycles, the result is ready and stored in a register while the value $z_N[n+1] = z_N[n] + \tau(k_N \operatorname{sign}(\sigma[n]))$ is calculated and stored in the memory. In the next clock cycles the values $$|\sigma[n]|^{\frac{N-i}{N+1}}$$

are generated by taking $$|\sigma|^{\frac{1}{N+1}}$$

and multiplying by itself starting by i=N−1 until i=0. This value is used to calculate $z_i[n]$ where its corresponding gain $k_i$ is taken from the memory using a counter 414 as the read address of the k-bank 410. This procedure will take N−1 clock cycles. The full procedure takes 1 cycle to store the error, B cycles to calculate the power, 1 cycle to store $z_N[n]$ and N−1 to store the resulting states, and 1 last cycle to generate the step_finish flag resulting in 2+B+N clock cycles. Example simulation results of the hardware differentiator 400 implementing the above algorithm are shown in and described with respect to FIG. 5, below.

Figure 5:
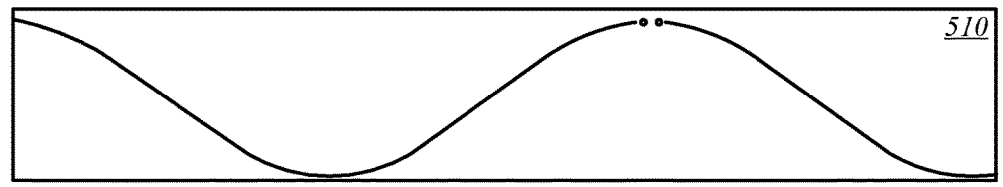
FIG. 5 is a diagram of simulation results of the hardware differentiator of FIG. 4 in accordance with one or more embodiments.
Figure 5:
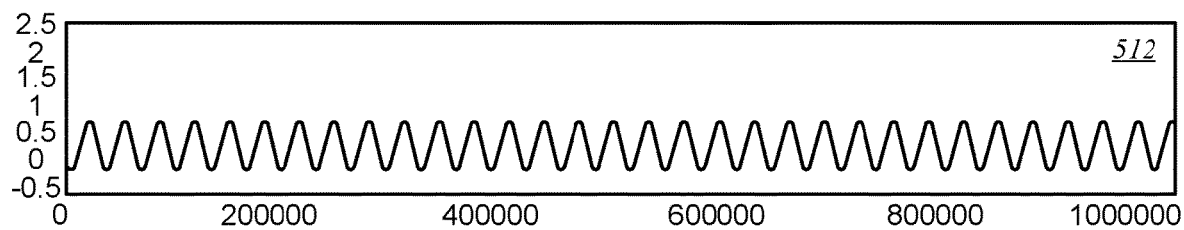
Figure 5:
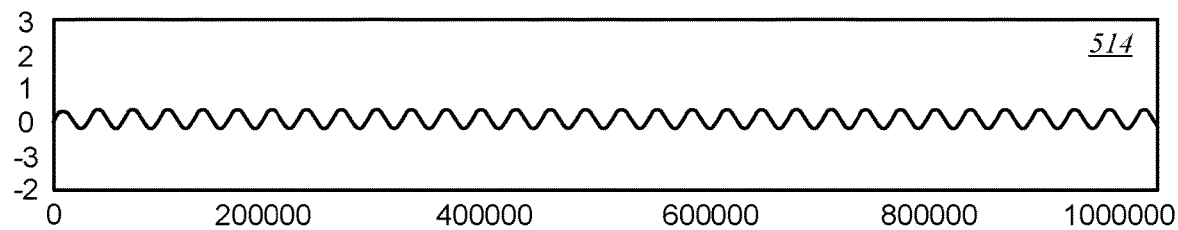
Figure 5:
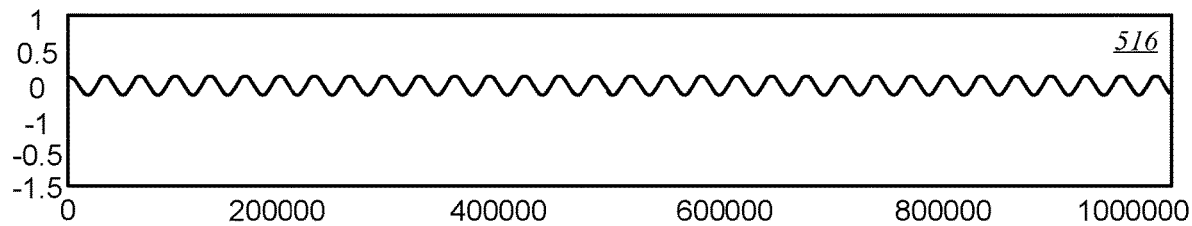

Referring now to FIG. 5, a diagram of simulation results of the hardware differentiator of FIG. 4 in accordance with one or more embodiments will be discussed. A simulation of the above discussed algorithm and hardware differentiator 400 was performed. The results of the simulation are shown in the graphs of FIG. 5 in which it can be seen that the estimator converges with high accuracy to the reference values of a simulated physical system 510 and its consecutive three derivatives, first derivative 512, second derivative 514, and third derivative 516.

In one or more embodiments, implementing a differentiation function as a hardware differentiator 400 allows system states to be estimated at high frequencies. For example, in our simulation we were able to run it at three megahertz (MHz). The hardware differentiator 400 may be used in a wide variety of robotic systems for example quadcopters or rovers. Furthermore, the hardware differentiator 400 may be used specific robotic system on chip (SoCs) by instantiating the hardware differentiator 400 as a peripheral module in order to run the estimator in parallel and in real-time.

The simulation results illustrate that the hardware differentiator 400 is able to provide state estimation of a physical system 100 such that may include one or more robotic vehicles. Thus, the the estimations may be performed in hardware. A general hardware module to calculate $|x|^z$, where x and z can be any real number, integer and fractional, represented in fixed point may be realized by hardware differentiator 400.

The algorithm utilized by hardware differentiator 400 applies the fact that $$|\sigma|^{\frac{N-i}{N+1}}$$

at each derivative operation can be calculated from accumulating recurrent multiplications of $$|\sigma|^{\frac{1}{N+1}}.$$

Figure 6:
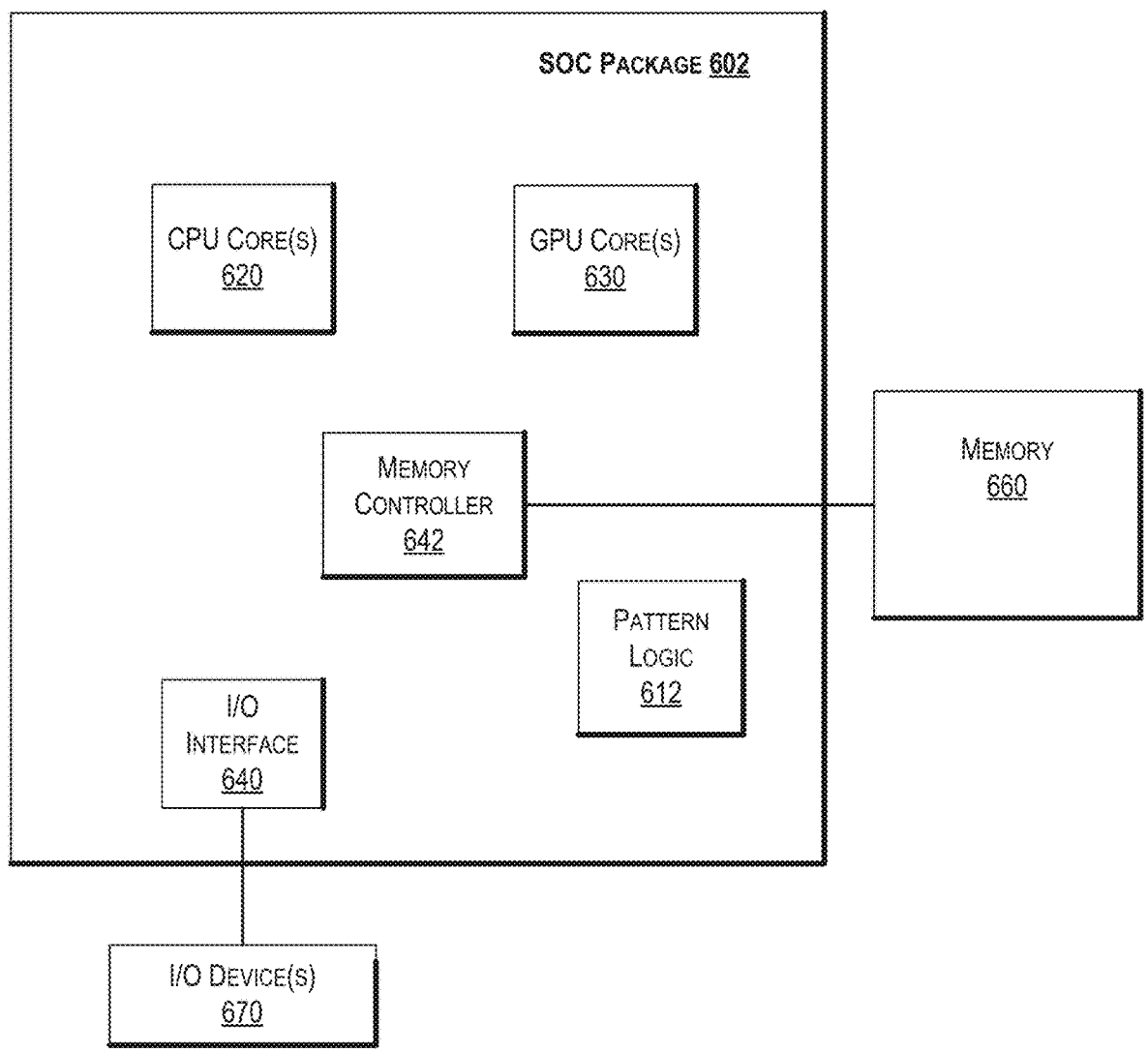
FIG. 6 illustrates a block diagram of a system on chip (SOC) package in accordance with an embodiment.

The hardware differentiator 400 to provide derivative estimates was developed such that any order of derivatives may be calculated, with the only constraint of the k constant and states memory bank size. Such an arrangement also allows the hardware differentiator 400 to occupy a minimal footprint, although the scope of the claimed subject matter is not limited in these respects FIG. 6 illustrates a block diagram of a system on chip (SOC) package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
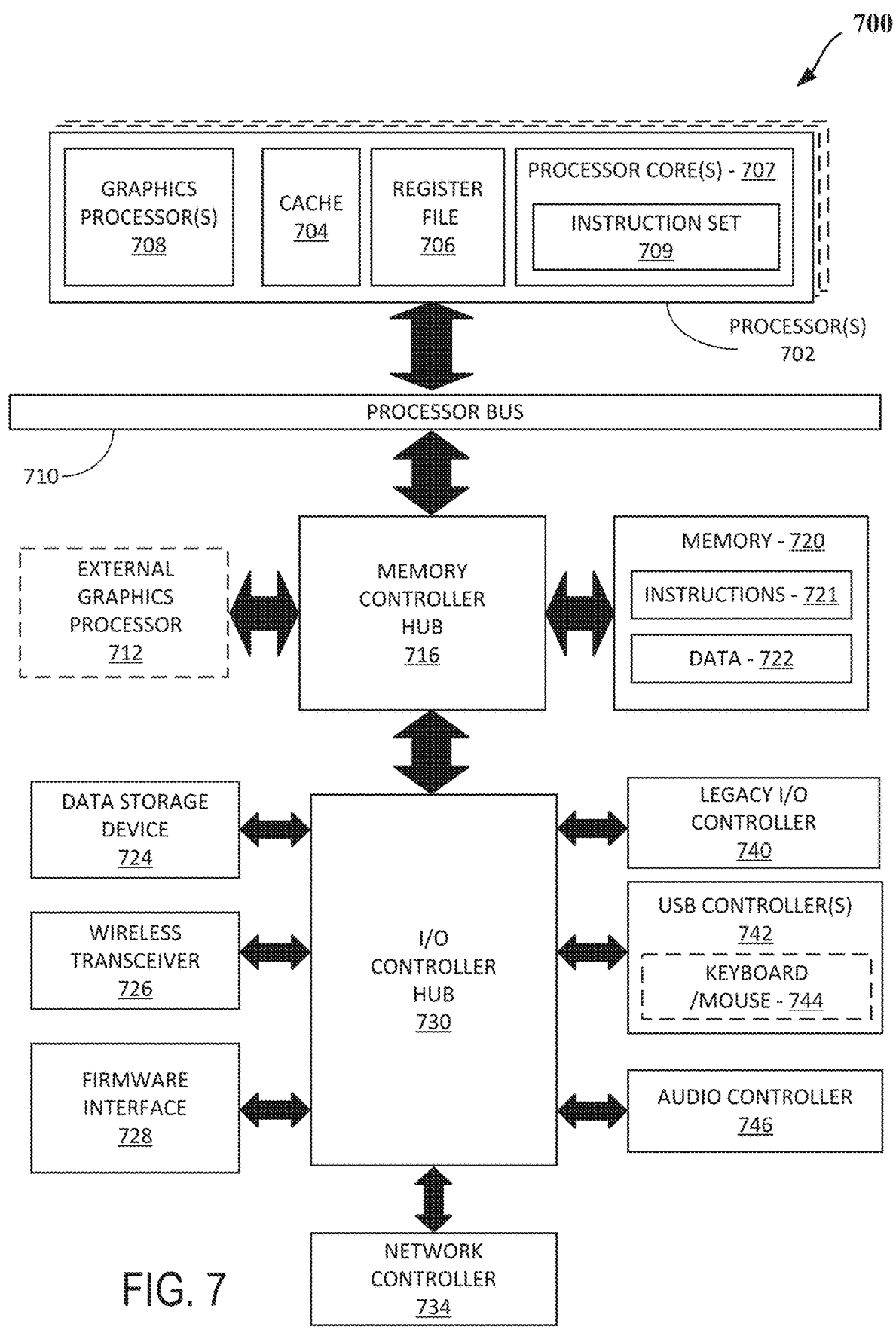
FIG. 7 is a block diagram of a processing system according to an embodiment.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary "hub" system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discrete external graphics processor, such as the external graphics processor 712.

Figure 8:
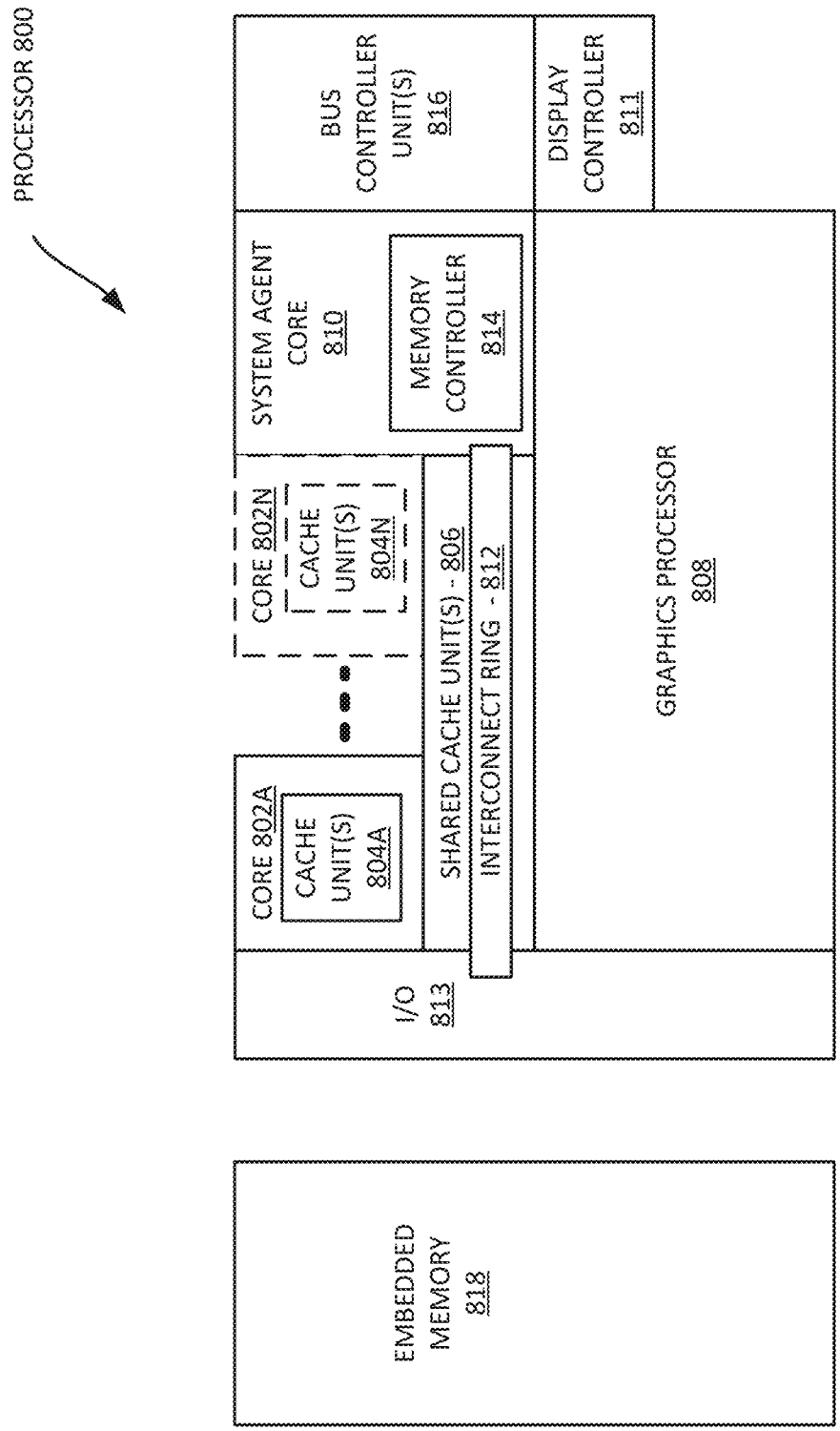
FIG. 8 is a block diagram of a processor having one or more processor cores, an integrated memory controller, and an integrated graphics processor in accordance with one or more embodiments.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multi-threading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect or may be integrated within the graphics processor 808 or system agent core 810.

In some embodiments, a ring-based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of micro-architecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
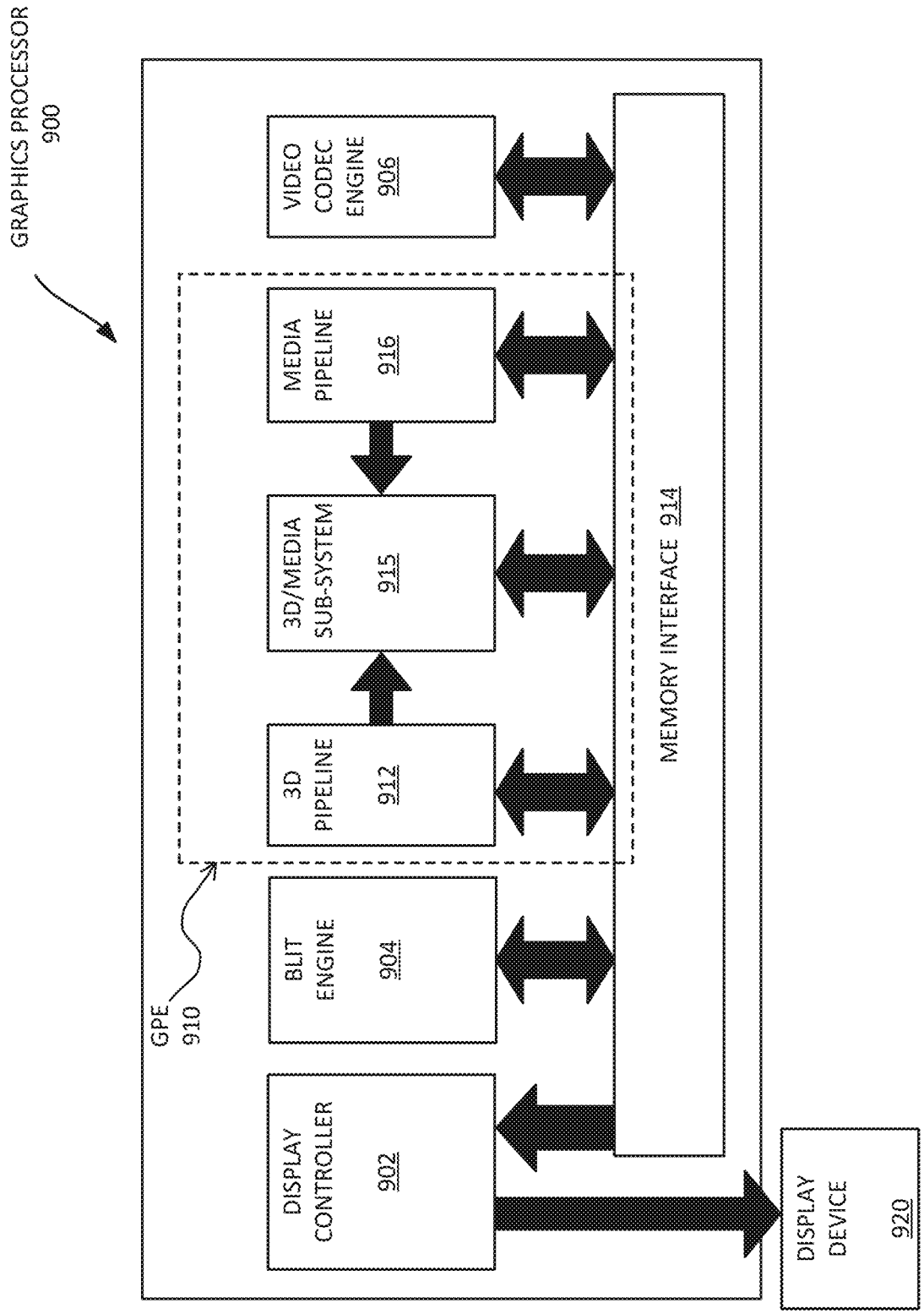
FIG. 9 is a block diagram of a graphics processor, which may be a discrete graphics processing unit, or may be a graphics processor integrated with a plurality of processing cores in accordance with one or more embodiments.

FIG. 9 is a block diagram of a graphics processor 900, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 902 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 2D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media sub-system 915.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory, including registers and addressable memory, to share data between threads and to store output data.

Figure 10:
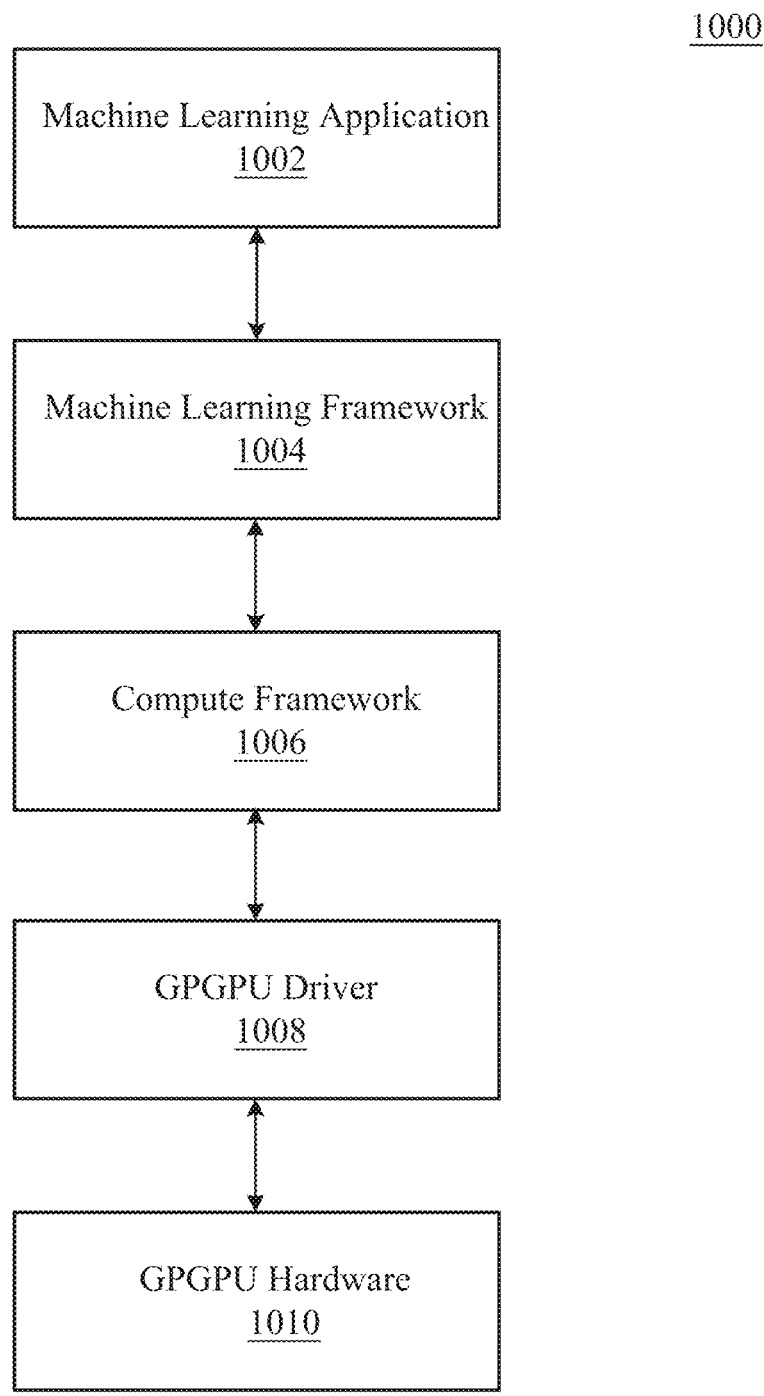
FIG. 10 is a generalized diagram of a machine learning software stack in accordance with one or more embodiments.

FIG. 10 is a generalized diagram of a machine learning software stack 900. A machine learning application 1102 can be configured to train a neural network using a training dataset or to use a trained deep neural network to implement machine intelligence. The machine learning application 902 can include training and inference functionality for a neural network and/or specialized software that can be used to train a neural network before deployment. The machine learning application 902 can implement any type of machine intelligence including but not limited to image recognition, mapping and localization, autonomous navigation, speech synthesis, medical imaging, or language translation.

Hardware acceleration for the machine learning application 902 can be enabled via a machine learning framework 904. The machine learning framework 904 can provide a library of machine learning primitives. Machine learning primitives are basic operations that are commonly performed by machine learning algorithms. Without the machine learning framework 904, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 904. Exemplary primitives include tensor convolutions, activation functions, and pooling, which are computational operations that are performed while training a convolutional neural network (CNN). The machine learning framework 904 can also provide primitives to implement basic linear algebra subprograms performed by many machine-learning algorithms, such as matrix and vector operations.

The machine learning framework 904 can process input data received from the machine learning application 902 and generate the appropriate input to a compute framework 906. The compute framework 906 can abstract the underlying instructions provided to the GPGPU driver 908 to enable the machine learning framework 904 to take advantage of hardware acceleration via the GPGPU hardware 1010 without requiring the machine learning framework 904 to have intimate knowledge of the architecture of the GPGPU hardware 1010. Additionally, the compute framework 1106 can enable hardware acceleration for the machine learning framework 904 across a variety of types and generations of the GPGPU hardware 1010.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 11:
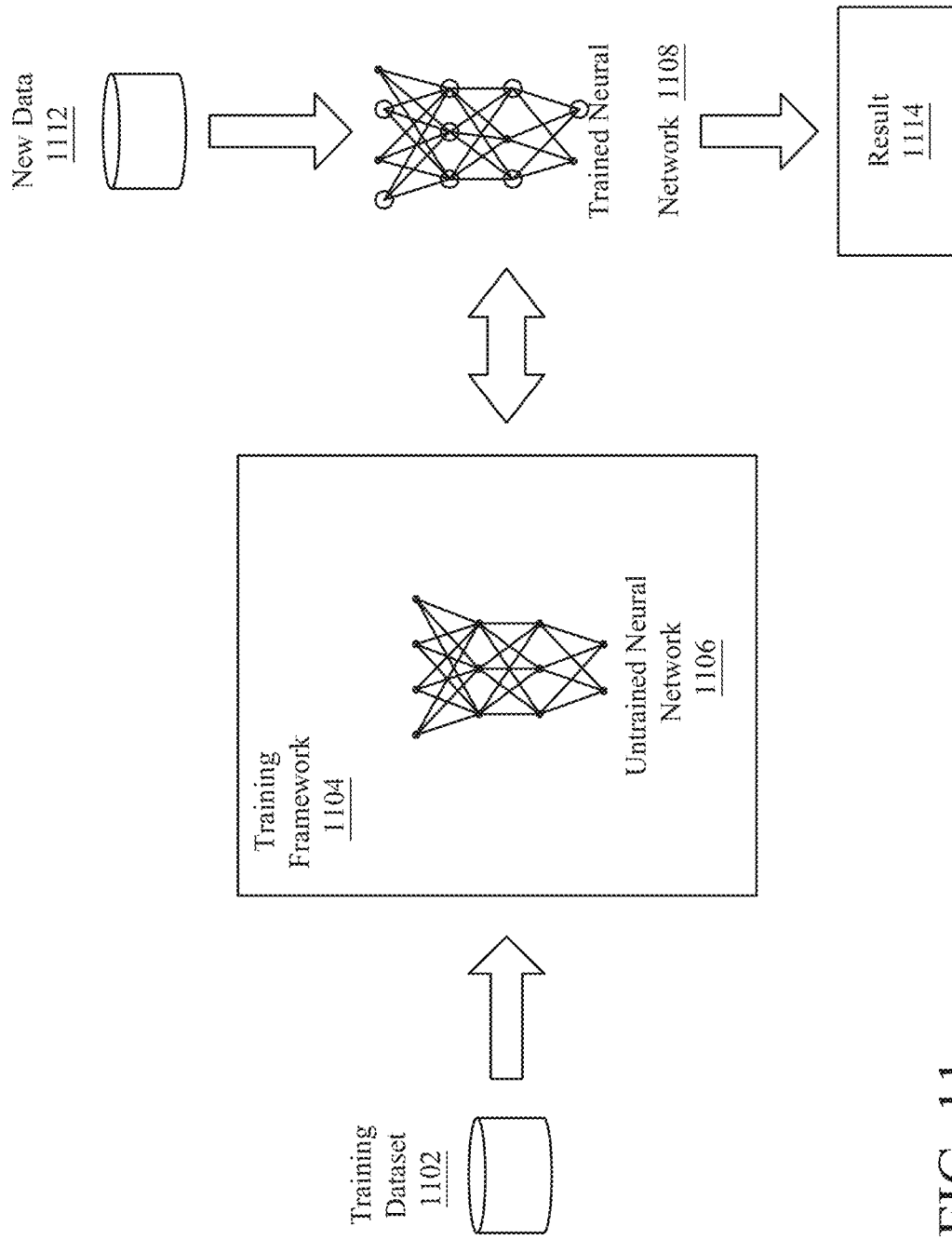
FIG. 11 illustrates training and deployment of a deep neural network in accordance with one or more embodiments.

FIG. 11 illustrates training and deployment of a deep neural network. Once a given network has been structured for a task the neural network is trained using a training dataset 1102. Various training frameworks have been developed to enable hardware acceleration of the training process. For example, the machine learning framework 904 of FIG. 9 may be configured as a training framework 1104. The training framework 1104 can hook into an untrained neural network 1106 and enable the untrained neural net to be trained using the parallel processing resources described herein to generate a trained neural network 1108. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1208. The trained neural network 1108 can then be deployed to implement any number of machine learning operations.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1107 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. In example one, an apparatus of an autonomous device comprises one or more state estimators to estimate one or more states of the autonomous device, wherein the one or more state estimators are to generate one or more derivatives of translational measurements, orientation measurements, reference translational values, and reference orientation values, and one or more controllers to receive an output from the one or more state estimators to provide control signals to control the autonomous device, wherein the one or more state estimators include a hardware differentiator to generate the one or more derivatives. Example two may include the subject matter of example one or any of the examples described herein, wherein the hardware differentiator comprises a Levant differentiator. Example three may include the subject matter of example one or any of the examples described herein, wherein the translational measurements comprise x, y, and z values for the autonomous device, and wherein the orientation measurements comprise yaw, pitch, and roll values for the autonomous device. Example four may include the subject matter of example one or any of the examples described herein, wherein the one or more state estimators comprise a three-dimensional differentiator. Example five may include the subject matter of example one or any of the examples described herein, wherein the hardware differentiator implements a fourth polynomial approximation of 2 to the power of u ($2^u$). Example six may include the subject matter of example one or any of the examples described herein, wherein the hardware differentiator is to calculate the absolute value of x raised to the z power ($|x|^z$) wherein x and z comprise a real integer number or a real fractional number represented in fixed point. Example seven may include the subject matter of example one or any of the examples described herein, wherein the autonomous device comprises an unmanned aerial vehicle (UAV), drone, quadcopter, or robot.

In example eight, a system of an autonomous device comprises a processor and a memory coupled to the processor, wherein the processor is to execute one or more general purpose instructions for the autonomous device, and a hardware module to control motion of the autonomous device, wherein the hardware module comprises one or more state estimators to estimate one or more states of the autonomous device, wherein the one or more state estimators are to generate one or more derivatives of translational measurements, orientation measurements, reference translational values, and reference orientation values, and one or more controllers to receive an output from the one or more state estimators to provide control signals to control the autonomous device, wherein the one or more state estimators include a hardware differentiator to generate the one or more derivatives. Example nine may include the subject matter of example eight or any of the examples described herein, wherein the hardware differentiator comprises a Levant differentiator. Example ten may include the subject matter of example eight or any of the examples described herein, wherein the translational measurements comprise x, y, and z values for the autonomous device, and wherein the orientation measurements comprise yaw, pitch, and roll values for the autonomous device. Example eleven may include the subject matter of example eight or any of the examples described herein, wherein the one or more state estimators comprise a three-dimensional differentiator. Example twelve may include the subject matter of example eight or any of the examples described herein, wherein the hardware differentiator implements a fourth polynomial approximation of 2 to the power of u ($2^u$). Example thirteen may include the subject matter of example eight or any of the examples described herein, wherein the hardware differentiator is to calculate the absolute value of x raised to the z power ($|x|^z$) wherein x and z comprise a real integer number or a real fractional number represented in fixed point. Example fourteen may include the subject matter of example eight or any of the examples described herein, wherein the autonomous device comprises an unmanned aerial vehicle (UAV), drone, quadcopter, or robot.

In example fifteen, a system on chip (SoC) for an autonomous device comprises a microcontroller and a peripheral bridge coupled to the microcontroller, and a peripheral module coupled to the microcontroller via the peripheral bridge, wherein the peripheral module comprises one or more state estimators to estimate one or more states of the autonomous device, wherein the one or more state estimators are to generate one or more derivatives of translational measurements, orientation measurements, reference translational values, and reference orientation values, and one or more controllers to receive an output from the one or more state estimators to provide control signals to control the autonomous device, wherein the one or more state estimators include a hardware differentiator to generate the one or more derivatives. Example sixteen may include the subject matter of example fifteen or any of the examples described herein, wherein the hardware differentiator comprises a Levant differentiator. Example seventeen may include the subject matter of example fifteen or any of the examples described herein, wherein the translational measurements comprise x, y, and z values for the autonomous device, and wherein the orientation measurements comprise yaw, pitch, and roll values for the autonomous device. Example eighteen may include the subject matter of example fifteen or any of the examples described herein, wherein the one or more state estimators comprise a three-dimensional differentiator. Example nineteen may include the subject matter of example fifteen or any of the examples described herein, wherein the hardware differentiator implements a fourth polynomial approximation of 2 to the power of u ($2^u$). Example twenty may include the subject matter of example fifteen or any of the examples described herein, wherein the hardware differentiator is to calculate the absolute value of x raised to the z power ($|x|^z$) wherein x and z comprise a real integer number or a real fractional number represented in fixed point. Example twenty-one may include the subject matter of example fifteen or any of the examples described herein, wherein the autonomous device comprises an unmanned aerial vehicle (UAV), drone, quadcopter, or robot.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described.

Rather, the specific features and acts are disclosed as sample forms of implementing the claimed subject matter.

The invention claimed is:

1. An apparatus of an autonomous device, comprising:
   a hardware module to control motion of the autonomous device, wherein the hardware module comprises:
   one or more state estimators to estimate one or more states of the autonomous device, wherein the one or more state estimators are to generate one or more derivatives of translational measurements, orientation measurements, reference translational values, and reference orientation values; and
   one or more controllers to receive an output from the one or more state estimators to provide control signals to control the autonomous device;
   wherein the one or more state estimators include a hardware differentiator to generate the one or more derivatives; and
   wherein the hardware module is configured to estimate the states of the autonomous device using a fixed point format in real-time and in parallel with operations of a general purpose processor of the autonomous device.

2. The apparatus of claim 1, wherein the hardware differentiator comprises a Levant differentiator.

3. The apparatus of claim 1, wherein the translational measurements comprise x, y, and z values for the autonomous device, and wherein the orientation measurements comprise yaw, pitch, and roll values for the autonomous device.

4. The apparatus of claim 1, wherein the one or more state estimators comprise a three-dimensional differentiator.

5. The apparatus of claim 1, wherein the hardware differentiator implements a fourth polynomial approximation of 2 to the power of u ($2^u$).

6. The apparatus of claim 1, wherein the hardware differentiator is to calculate the absolute value of x raised to the z power ($|x|^z$) x and z comprise a real integer number or a real fractional number represented in fixed point.

7. The apparatus of claim 1, wherein the autonomous device comprises an unmanned aerial vehicle (UAV), drone, quadcopter, or robot.

8. A system of an autonomous device, comprising:
   a processor and a memory coupled to the processor, wherein the processor is to execute one or more general purpose instructions for the autonomous device; and
   a hardware module to control motion of the autonomous device, wherein the hardware module comprises:
   one or more state estimators to estimate one or more states of the autonomous device, wherein the one or more state estimators are to generate one or more derivatives of translational measurements, orientation measurements, reference translational values, and reference orientation values; and
   one or more controllers to receive an output from the one or more state estimators to provide control signals to control the autonomous device;
   wherein the one or more state estimators include a hardware differentiator to generate the one or more derivatives; and
   wherein the hardware module is configured to estimate the one or more states of the autonomous device using a fixed point format in real-time and in parallel with operations of the processor.

9. The system of claim 8, wherein the hardware differentiator comprises a Levant differentiator.

10. The system of claim 8, wherein the translational measurements comprise x, y, and z values for the autonomous device, and wherein the orientation measurements comprise yaw, pitch, and roll values for the autonomous device.

11. The system of claim 8, wherein the one or more state estimators comprise a three-dimensional differentiator.

12. The system of claim 8, wherein the hardware differentiator implements a fourth polynomial approximation of 2 to the power of u (2u).

13. The system of claim 8, wherein the hardware differentiator is to calculate the absolute value of x raised to the z power ($|x|^z$) wherein x and z comprise a real integer number or a real fractional number represented in fixed point.

14. The system of claim 9, wherein the autonomous device comprises an unmanned aerial vehicle (UAV), drone, quadcopter, or robot.

15. A system on chip (SoC) for an autonomous device, comprising:
    a microcontroller and a peripheral bridge coupled to the microcontroller, wherein the microcontroller is to execute one or more general purpose instructions for the autonomous device; and
    a peripheral module coupled to the microcontroller via the peripheral bridge, wherein the peripheral module comprises:
    one or more state estimators to estimate one or more states of the autonomous device, wherein the one or more state estimators are to generate one or more derivatives of translational measurements, orientation measurements, reference translational values, and reference orientation values; and
    one or more controllers to receive an output from the one or more state estimators to provide control signals to control the autonomous device;
    wherein the one or more state estimators include a hardware differentiator to generate the one or more derivatives; and
    wherein the peripheral module is configured to estimate the one or more states of the autonomous device using a fixed point format in real-time and in parallel with operations of the microcontroller.

16. The SoC of claim 15, wherein the hardware differentiator comprises a Levant differentiator.

17. The SoC of claim 15, wherein the translational measurements comprise x, y, and z values for the autonomous device, and wherein the orientation measurements comprise yaw, pitch, and roll values for the autonomous device.

18. The SoC of claim 15, wherein the one or more state estimators comprise a three-dimensional differentiator.

19. The SoC of claim 15, wherein the hardware differentiator implements a fourth polynomial approximation of 2 to the power of u (2u).

20. The SoC of claim 15, wherein the hardware differentiator is to calculate the absolute value of x raised to the z power ($|x|^z$) wherein x and z comprise a real integer number or a real fractional number represented in fixed point.

* * * * *